United States Patent
Chenault, III et al.

(10) Patent No.: US 9,815,323 B2
(45) Date of Patent: Nov. 14, 2017

(54) CAST ALUMINUM WHEEL

(71) Applicant: Superior Industries International, Inc., Southfield, MI (US)

(72) Inventors: H. Clay Chenault, III, Fayetteville, AR (US); Timothy Wayne Hood, Fayetteville, AR (US); Parveen Kakar, Novi, MI (US)

(73) Assignee: Superior Industries International, Inc., Southfield, MI (US)

( * ) Notice: Subject to any disclaimer, the term of this patent is extended or adjusted under 35 U.S.C. 154(b) by 0 days.

(21) Appl. No.: 14/805,999

(22) Filed: Jul. 22, 2015

(65) Prior Publication Data

US 2016/0023509 A1 Jan. 28, 2016

Related U.S. Application Data

(60) Provisional application No. 62/028,555, filed on Jul. 24, 2014.

(51) Int. Cl.
*B60B 1/08* (2006.01)
*B22D 25/02* (2006.01)
(Continued)

(52) U.S. Cl.
CPC ............... *B60B 1/08* (2013.01); *B22D 17/00* (2013.01); *B22D 21/04* (2013.01); *B22D 25/02* (2013.01);
(Continued)

(58) Field of Classification Search
CPC .... B60B 3/02; B60B 3/06; B60B 3/10; B60B 3/007; B60B 1/08; B60B 1/06; B22D 25/02; B22D 21/04; B22D 17/00
See application file for complete search history.

(56) References Cited

U.S. PATENT DOCUMENTS 1,558,656 A * 10/1925 Waterbor ................. B60B 1/08
  301/65
4,693,520 A   9/1987 Brown
(Continued)

FOREIGN PATENT DOCUMENTS

DE        9117160 U1 *  7/1996  ............... B60B 3/06
DE       19601778 A1 *  4/1997  ............... B60B 1/08
DE       10158408 A1 *  6/2003  ............... B60B 3/02

OTHER PUBLICATIONS

PCT/US2015/41942 International Search Report dated Dec. 22, 2015, 4 pages.

*Primary Examiner* — Kip T Kotter
(74) *Attorney, Agent, or Firm* — Warner Norcross & Judd LLP

(57) ABSTRACT

A cast aluminum wheel includes a rim element having an annular configuration defining an axis and a central element extending radially outwardly between the axis and the rim element. The rim element includes a wall extending circumferentially around the axis between a proximal bead and a distal bead. The central element includes a plurality of spokes extending radially outwardly toward the proximal bead and meets proximate the axis with adjacent of the plurality of spokes defining a cooperative feature therebetween for providing stiffness to the wheel. The spokes progressively increase in volume in a direction toward the axis from the rim element thereby providing increased mass of the spokes proximate the axis relative to the rim element.

6 Claims, 6 Drawing Sheets

(51) Int. Cl.
  *B60B 3/06* (2006.01)
  *B60B 3/02* (2006.01)
  *B60B 3/10* (2006.01)
  *B22D 21/04* (2006.01)
  *B22D 17/00* (2006.01)

(52) U.S. Cl.
  CPC ............... B60B 3/02 (2013.01); B60B 3/06 (2013.01); B60B 3/10 (2013.01); *B60B 2310/202* (2013.01); *B60B 2310/228* (2013.01); *B60B 2360/104* (2013.01); *B60B 2900/111* (2013.01); *B60B 2900/311* (2013.01)

(56) References Cited

U.S. PATENT DOCUMENTS

| | | | |
|---|---|---|---|
| 5,538,329 A | | 7/1996 | Stach |
| 6,024,415 A | * | 2/2000 | Stach ................. B60B 1/08 301/63.107 |
| 6,428,116 B1 | * | 8/2002 | Chou ................. B60B 1/003 301/104 |
| 2001/0026094 A1 | * | 10/2001 | Bhambra ................. B60B 3/02 301/65 |
| 2002/0158504 A1 | | 10/2002 | Ito et al. |
| 2007/0277377 A1 | * | 12/2007 | Tosi ................. B60B 3/02 29/894.35 |
| 2008/0086886 A1 | | 4/2008 | Kamiya |
| 2014/0152078 A1 | | 6/2014 | Noriega |
| 2015/0360509 A1 | * | 12/2015 | Werner ................. B60B 3/10 301/64.101 |

* cited by examiner

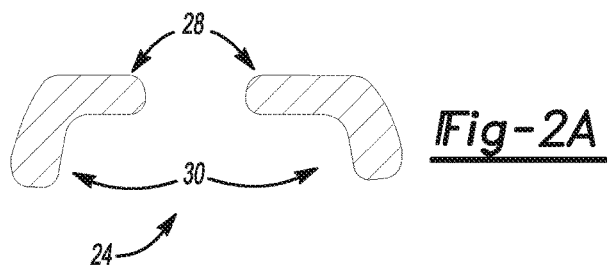
Fig-2A
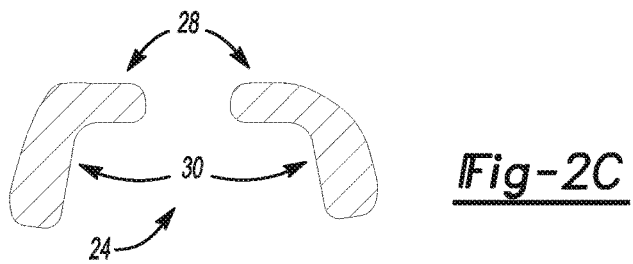
Fig-2B
Fig-2C
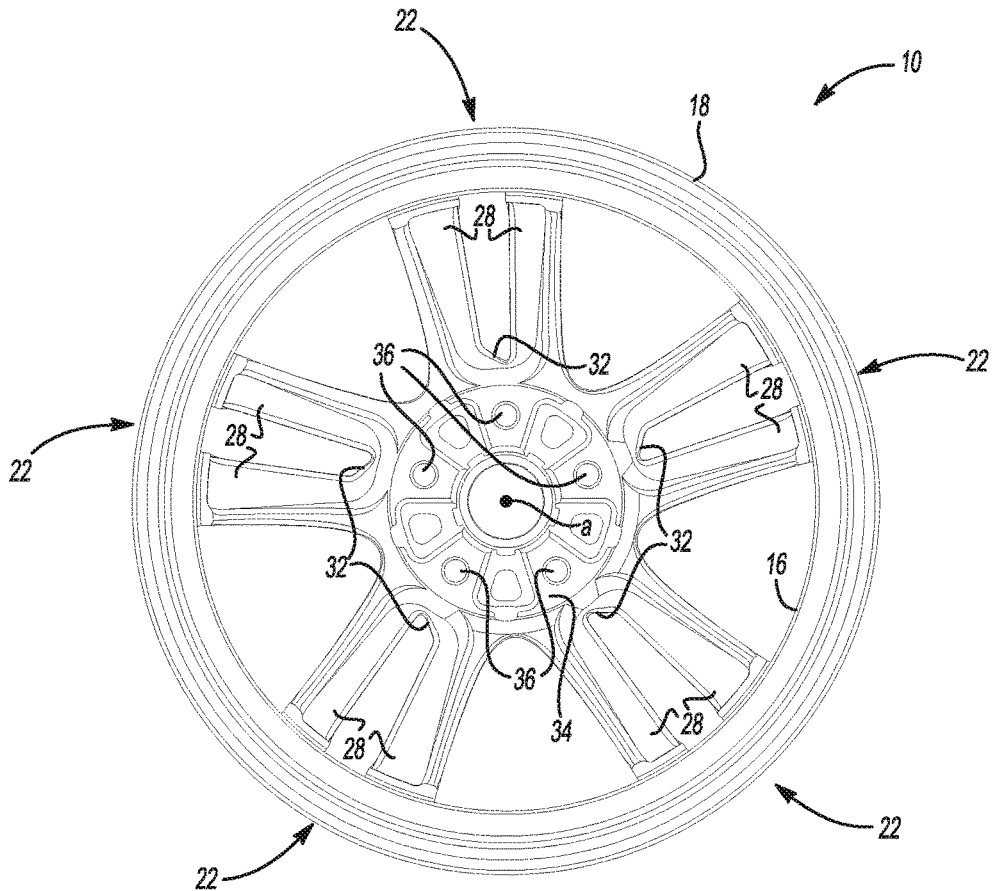
Fig-3

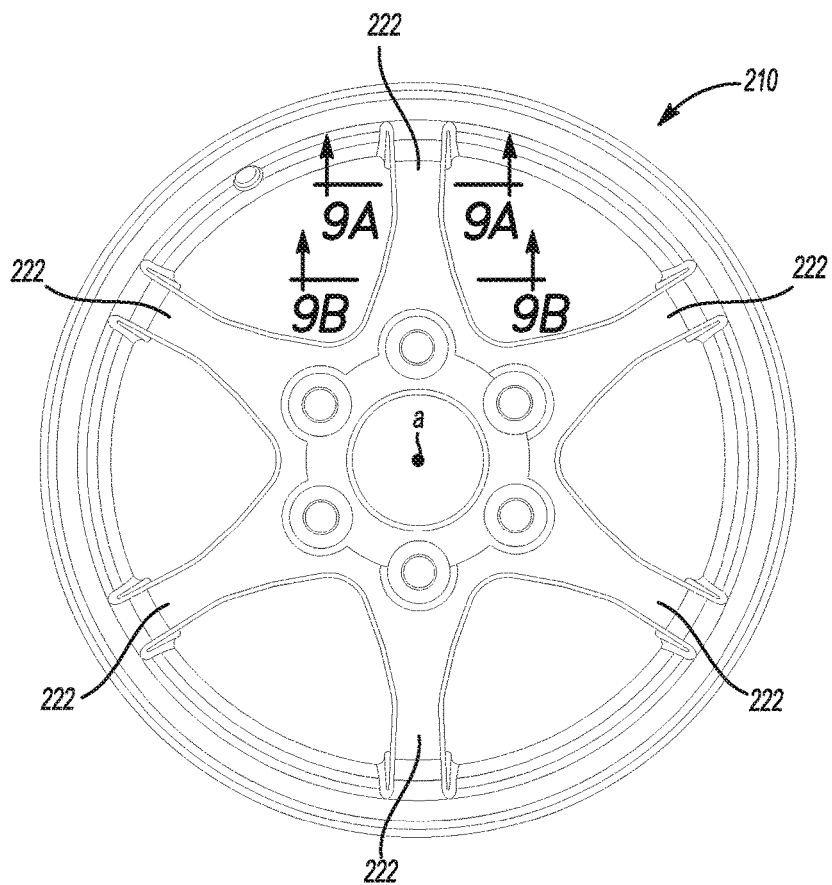
*Fig-9*
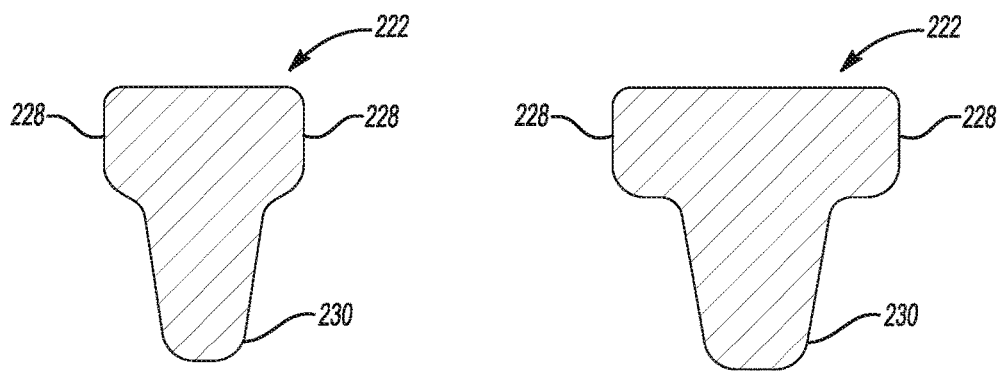
*Fig-9A*  *Fig-9B*

CAST ALUMINUM WHEEL

PRIOR APPLICATIONS

The present application claims priority to U.S. Provisional Patent Application No. 62/028,555, filed on Jul. 24, 2014.

TECHNICAL FIELD

The present invention is related generally toward a cast aluminum wheel. More specifically, the present invention is related toward a cast aluminum wheel having an optimized three dimensional configuration to increase stiffness and reduce mass.

BACKGROUND

Cast aluminum wheels have been in use on road vehicles for many years. The light weight and esthetically pleasing qualities of the cast aluminum wheel has made the wheel a desirable option on many mass production vehicles. However, cast aluminum wheels are often cost prohibitive due to the cost of manufacturing. Additionally, cast aluminum wheels do not provide enough mass savings to justify the added cost when fuel efficiency is not achieved.

During production, a cast aluminum wheel requires a significant amount of machining to form the wheel in a desired commercial configuration. A cast aluminum wheel includes a rim portion and a central element having spokes extending radially outwardly between a wheel axis and the rim portion. A typical spoke requires upwards of 80% machining to achieve required dimensional accuracy. Machining typically reforms those portions of the wheel into a desired configuration and providing an aesthetically pleasing finish. However, machining also results in sharp transitional edges between adjacent surfaces, which are known to be a source of initiation of stress fractures. In addition, spokes disposed on the wheel between a rim portion and a central element of the wheel are typically provided with substantial thickness and mass to provide necessary strength and stiffness to the wheel, which is cost prohibitive and contrary to efforts to reduce mass.

Thus, efforts to reduce mass of cast aluminum wheels has proven elusive due to structural fatigue, performance, styling and reduced stiffness, all of which are known defects from a reduction in the mass of the spokes. Therefore, it would be desirable to provide a wheel that has both increased stiffness and reduced mass.

SUMMARY

A cast aluminum wheel includes a rim element and a central element extending radially outward between a wheel axis and the rim element. The rim element includes a wall extending circumferentially around the axis between a proximal bead and a distal bead. A plurality of spokes extend radially outwardly toward the proximal bead and meet proximate the axis with adjacent of the plurality of spokes defining a cooperative feature for providing stiffness. The spokes progressively increase in volume in a direction toward the axis from the rim element thereby providing increased mass of the spokes proximate the axis relative to the rim element.

The cooperative feature between adjacent of the plurality of spokes provides necessary structural stiffness to eliminate cross sectional area of the spokes, and, therefore, the mass of each of the spokes. As such, the wheel of the present invention has provided an enhanced wheel structure without adding mass to the spokes, and therefore to the wheel as is commonly known. Furthermore, the configuration of the central element between a centrally located lug member where lug apertures are defined and the rim element has eliminated the need to machine surfaces of the central element as is known. Thus, the spokes are as-cast, or substantially as-cast, which enhances physical attributes, such as stiffness and durability. Therefore, the wheel of the present invention not only reduces mass and improves stiffness, but also eliminates a costly and time consuming machine operation known to present cast aluminum wheels.

BRIEF DESCRIPTION OF THE DRAWINGS

Other advantages of the present invention will be readily appreciated as the same becomes better understood by reference to the following detailed description when considered in connection with the accompanied drawings, wherein:

FIGS. 2A, 2B, and 2C show cross-sectional views through lines 2A-2A, 2B-2B, and 2C-2C of FIG. 2, respectively;

FIG. 3 shows a rear view of the wheel of the first embodiment of the present invention;

FIG. 9 shows a front view of third embodiment of the wheel of the present invention; and FIGS. 9A and 9B show cross-sectional views of through lines 9A-9A and 9B-9B of FIG. 9.

DETAILED DESCRIPTION

Figure 1:
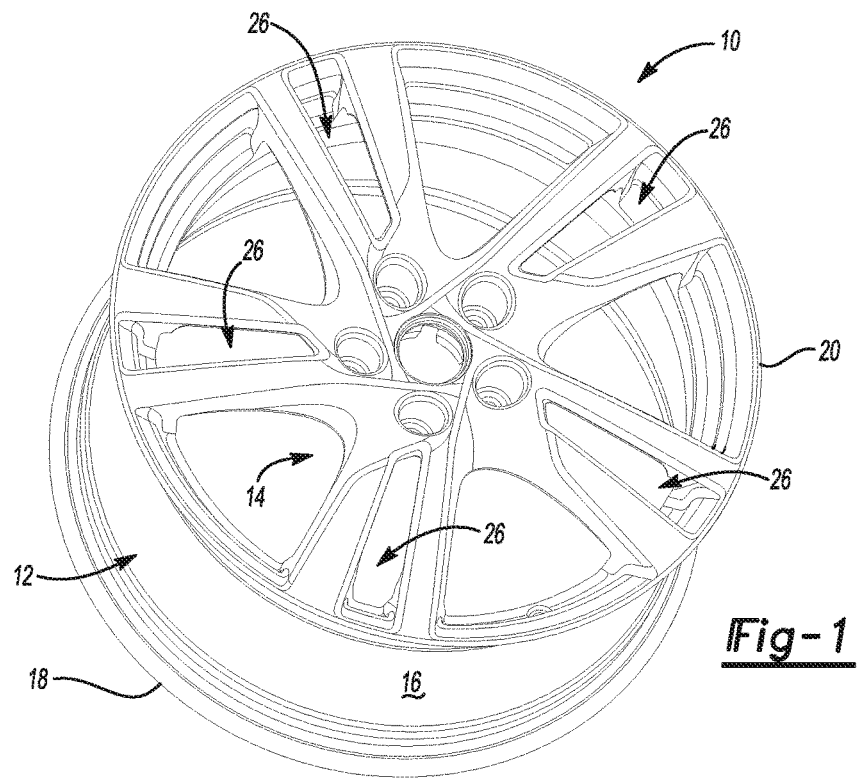
FIG. 1 shows a perspective view of a first embodiment of the wheel of the present invention.
Figure 2:
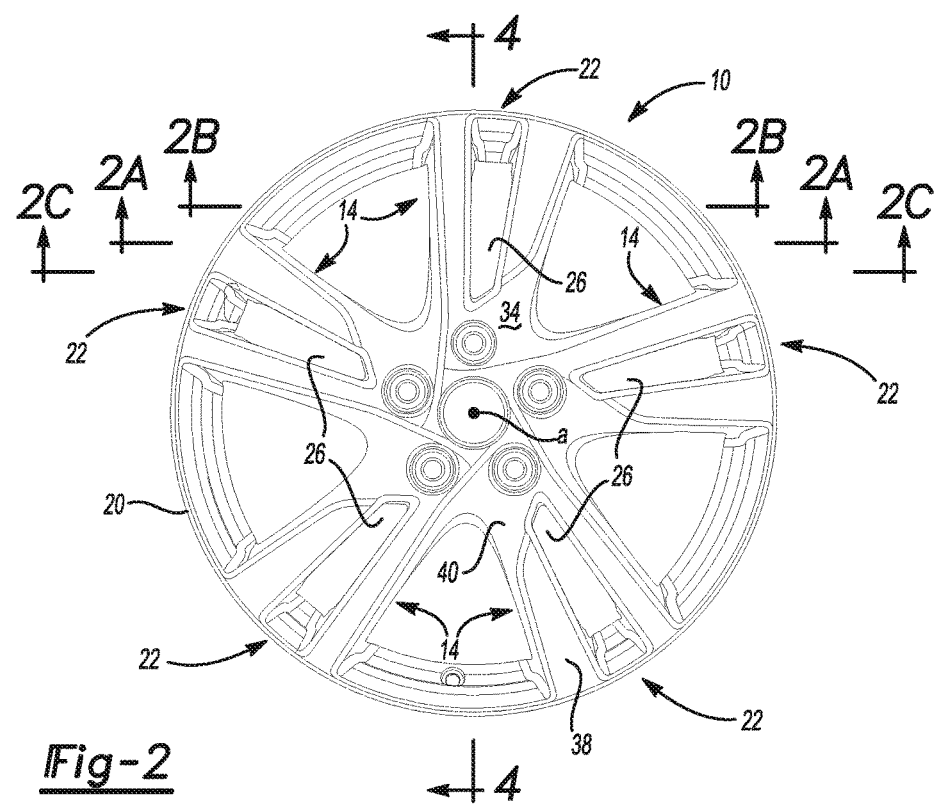
FIG. 2 shows a front view of the wheel of the first embodiment of the present invention.

Referring to FIG. 1, a wheel of the present invention is generally shown at 10. The wheel includes a rim element 12 that defines an axis a (FIG. 2). A central element 14 extends radially outwardly between the axis a and the rim element 12. The rim element 12 defines a drop surface (or annular wall) 16 that extends between a distal bead 18 and a proximal bead 20 at a location that is disposed radially inwardly from the two beads 18, 20. It should be understood by those of ordinary skill in the art that the proximal bead 18 is located outboard of a motor vehicle (not shown) and the distal bead 20 is located inboard of the motor vehicle. Furthermore, the drop surface 16 is defined as a cylindrical surface circumscribing the axis a in a known manner.

Referring now to FIGS. 2, 2A-2C the central element 14 includes a plurality of cooperable spoke pairs 22. In this embodiment, each spoke pair 22 defines opposing, substantially L-shaped segments 24, the combination of which define an opening 26. Each substantially L-shaped segment 24 of the spoke pairs 22 define cross-sections progressing toward the axis a as best represented through sections 2A-2A, 2B-2B, and 2C-2C of FIG. 2. The sections 2A-2A, 2B-2B, and 2C-2C each show opposing first legs 28 having a generally common planar orientation and opposing second legs 30 defining generally parallel planar orientations. The first opposing legs 28, as best represented in sections, 2A-2A, 2B-2B, and 2C-2C of FIG. 2, define a generally constant thickness extending between the rim element 12 and the axis a. The second opposing legs 30 define a generally increasing thickness progressing from the rim element 12 toward the axis a. In this manner, the cooperable spoke pairs 22, by virtue of increasing mass progressively toward the axis a, position the moment of inertia of the spoke pairs 22 toward the axis a.

Furthermore, the opposing L-shaped sections 24 define an opening 26, the combination of which has proven to provide an enhanced stiffness to the wheel 10. In this manner, the enhanced stiffness allows for the reduction of overall mass of the wheel 10, which is contrary to prior art wheels where mass has previously been increased to achieve requisite stiffness and ride dynamics. It should be understood that the cooperable spoke pairs 22 of this embodiment are merely exemplary and should not be interpreted as limiting. For example, cooperable spokes can also take the form of adjacent spokes and are not limited to "pairs". Adjacent spokes 14 define cooperative features, the configuration of which allows for reducing the mass of the spokes 14 while simultaneously enhancing stiffness of the wheel 10. This is counterintuitive to the standard practice of increasing mass of the spokes as has been the method commonly used.

Referring now to FIG. 3, where a rear view of the wheel 10 is shown, it is readily apparent that the opposing first legs 28 of the L-shaped sections 24 converge to define a web 32 proximate a lug member 34. The lug member 34 circumscribes the axis a at a location disposed radially inwardly from the drop surface 16. The lug member 34 defines a plurality of lug apertures 36. Each of the lug apertures 36 are disposed in the lug member 34 at a location that is circumferentially aligned with and radially inwardly of one of the plurality of cooperable spoke pairs 22. It should be readily apparent that the plurality of cooperable spoke pairs 22 terminate at the proximal bead 18 at a distal end 38 and at the lug member 34 at a proximal end 40.

Figure 4:
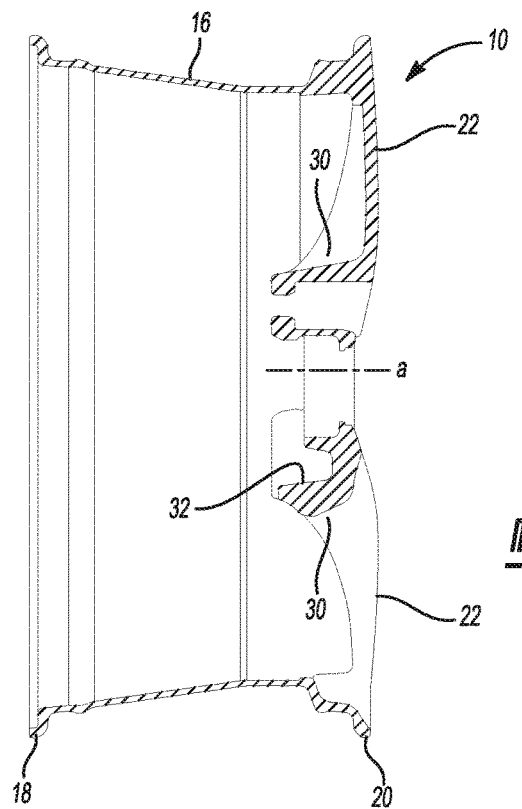
FIG. 4 shows a cross-sectional view through an axis of the wheel of the first embodiment.
Figure 5:
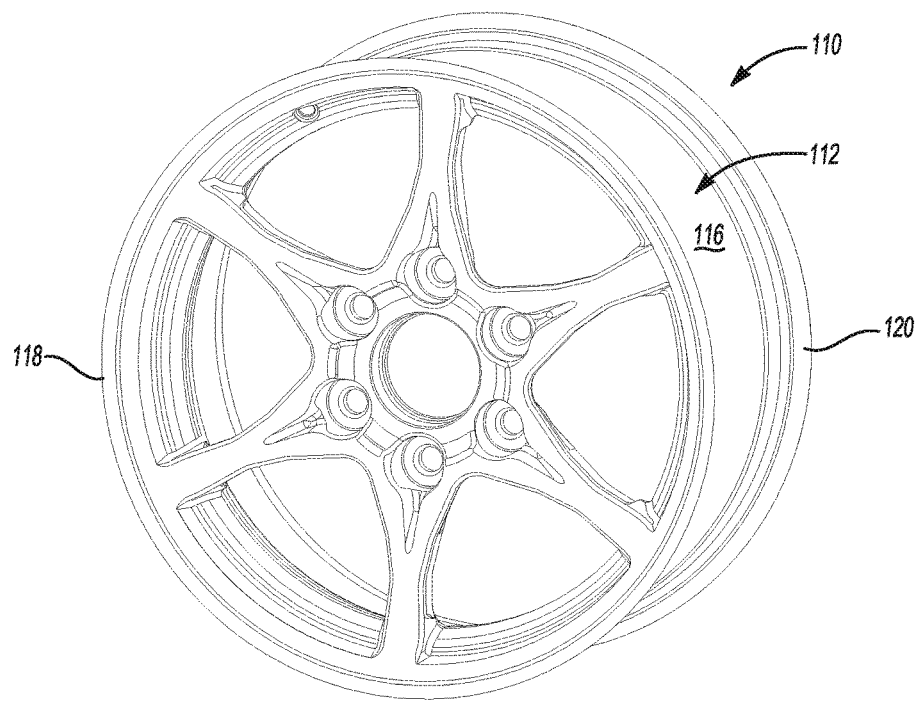
FIG. 5 shows a perspective view of a second embodiment of the wheel of the present invention.

FIG. 4 shows a section through the axis a of FIG. 2. This section shows the opposing second leg 30 increasing in thickness as it extends toward the axis a. Additionally, the web 32 is also visible in FIG. 4. The web 32 defines a part of the cooperable features between adjacent spokes 14. A further unique element of the present invention is the reduction of machining relative to typical, prior art spokes of a cast wheel.

As shown in FIG. 4, the entire in-board side of the spoke is represented as an as-cast surface. This is unique when compared to prior art cast wheels that require the inboard side of spokes to be machined using turning operations resulting in machined bands defining a given spoke. By eliminating machining on the cooperable spoke pairs 22 a radius transition best seen in sections 2A-2A, 2B-2B, and 2C-2C of FIG. 2 are achieved resulting in a reduction in stresses known to cause reduced performance and even failure. Machining is limited to defining the lug apertures 36, precision of beads 18, 20 and other features not relevant to stiffness or durability of the wheel 10. Furthermore, flashing resultant from parting lines of manufacturing dies (not shown) are moved away from critical areas of the cooperable spoke pairs 22 to surfaces that are not visible from a front side of the wheel 10 where removal is easily performed without affecting the integrity of the as-cast, cooperable spoke pairs 22.

A first alternative embodiment is shown in FIGS. 5-8 where like elements are identified with like element numbers, but in the 100 series. The alternative wheel is generally shown at 110 of FIG. 5. The alternate wheel 110 is intended for use with a decorative overlay (not shown) like that disclosed in U.S. Pat. Nos. 6,346,159 and 7,097,730, the contents of which are incorporated herein by reference. To enhance design flexibility of the decorative overlay it is beneficial to reduce surface area required of structural elements without reducing performance of the wheel 110. The alternate wheel not only enhances performance, but reduces mass by limiting the surface area required of the structural elements.

Figure 6:
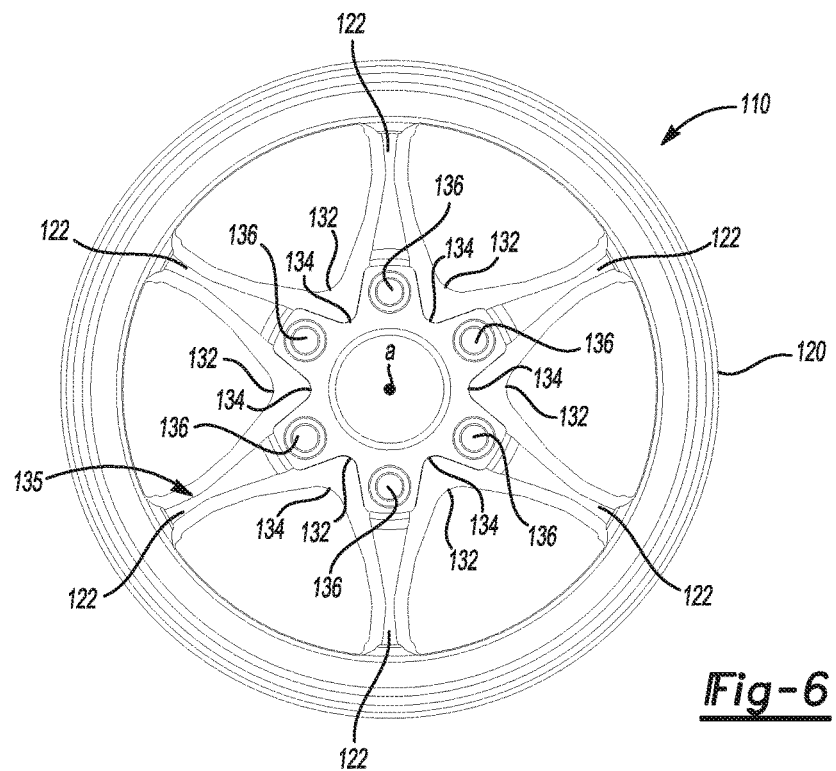
FIG. 6 shows a rear view of the wheel of the second embodiment.

The wheel includes a rim element 112 that defines an axis a (FIG. 6). A central element 114 extends radially outwardly between the axis a and the rim element 112. The rim element 112 defines a drop surface (or annular wall) 116 that extends between a distal bead 120 and a proximal bead 118 at a location that is disposed radially inwardly from the two beads 118, 120. It should be understood by those of ordinary skill in the art that the proximal bead 118 is located outboard of a motor vehicle (not shown) and the distal bead 120 is located inboard of the motor vehicle. Furthermore, the drop surface 116 is defined as a cylindrical surface circumscribing the axis a in a known manner.

Referring now to FIG. 6, the central element 114 includes a plurality of spokes 122, in this embodiment numbering six. It should be understood to those of ordinary skill in the art that more or less spokes may be included depending on the application. Each spoke extends between a lug member 134 and the proximal bead 118. The lug member 134 circumscribes the axis a at a location disposed radially inwardly of the drop surface 116. A web 132 extends between adjacent spokes 122 so that each of the adjacent spokes 122 defines a progressing trapezoidal section toward the lug member 134. The lug member 134 defines a plurality of lug apertures 136. Each of the lug apertures 136 are disposed in the lug member 134 at a location that is circumferentially aligned with and radially inwardly of one of the plurality of spokes 122.

Figure 7:
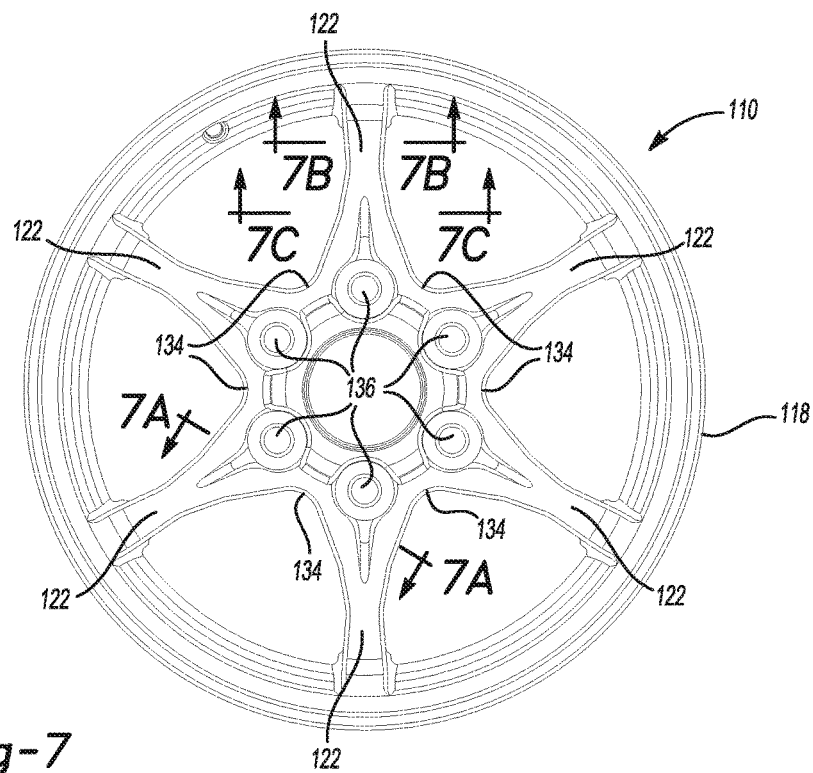
FIG. 7 shows a front view of the wheel of the second embodiment.
Figure 7A:
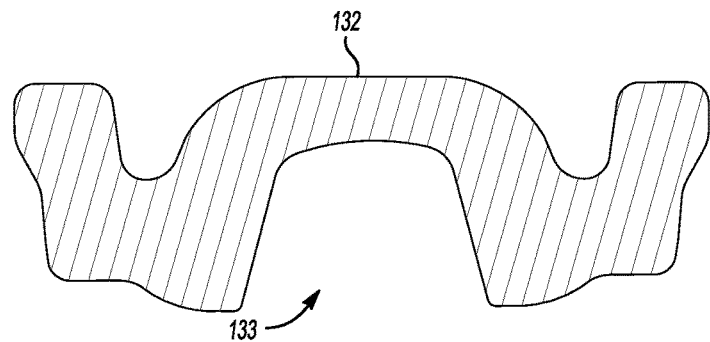
FIGS. 7A, 7B, and 7C show cross-sectional views through lines 7A-7A, 7B-7B and 7C-7C of FIG. 7.
Figure 7B:
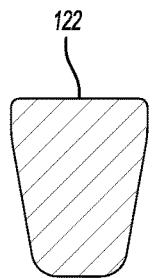
Figure 7C:
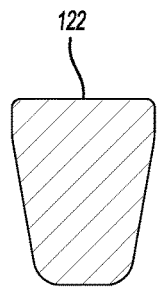

Referring now to FIG. 7, a front view of the wheel 110 is shown. A cross-section of the spokes 122 is shown through lines 7B-7B and 7C-7C. It should be apparent that the mass increases as the spokes 122 progress radially inwardly toward the axis a moving the moment of inertia toward the axis a from proximate the rim element 112. Line 7A-7A is drawn through adjacent spokes 122 and through the web 132 providing a substantially W shaped cross section where a groove 133 transitions from the spoke 122 to the lug apertures 136. The combination of the groove 133 and the web 132 increases the stiffness of the spokes 112.

Figure 8:
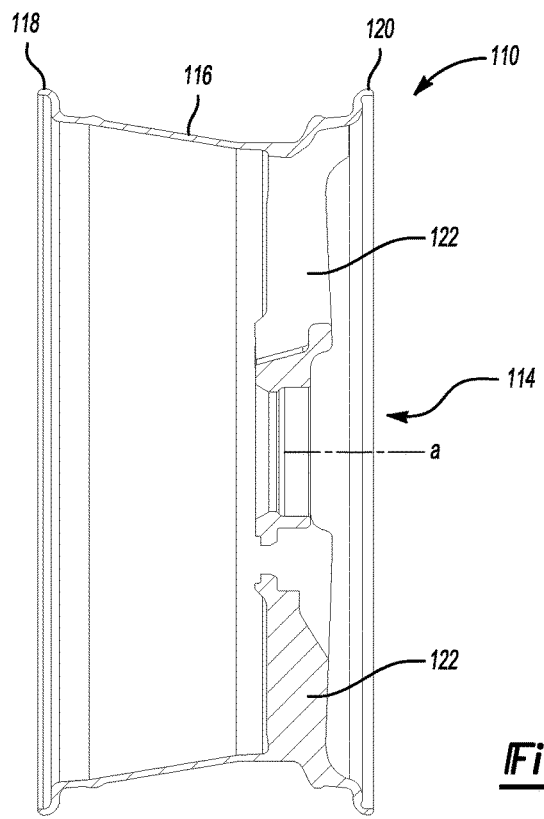
FIG. 8 shows a cross-sectional view through an axis of the wheel of the second embodiment.

Referring now to FIG. 8, a cross sectional view of the alternative wheel 112 is shown. The spoke 122 is displaced from the distal bead 120 axially toward the proximal bead 118 so generally half of the cross-sectional thickness of the spoke 122 overlaps the annular wall 116 of the rim element 112. Additionally shown on FIG. 8, the spokes 122 are substantially as-cast where the configuration of the spokes 122 is entirely or nearly entirely as cast.

As set forth above, contours of the prior art spokes are machined by a lathe to achieve desired dimensions. For the first time, a substantially as-cast spoke 122 is developed with the proper dimensional characteristics to provide enhanced stiffness. Both embodiments of the present invention require less than 15% machining. Further, these embodiments are contemplated to require less than 10% machining relative to the central element or spokes 114 is limited to flashing left from the die parting lines. As used herein, "as cast" includes spokes having only flashing resulting from die parting lines is machined and the cast configuration of the spokes is left unaltered. As in the prior embodiment, the parting lines, and therefore the flashing, are moved from the transitional elements and corners of the spokes 122 to a rear surface 135 of the wheel central element 114 eliminating the need to machine the in-board side of the spokes 122 on a lathe. Further, the deflashing does not substantially alter the dimension of the as-cast portion of the wheel. This differs significantly from the machine operation on a lathe, which is a two dimensional process leaving machined edges on the prior art structural spokes.

A still further embodiment is shown in FIGS. 9, 9A and 9B in which like elements with the above embodiments are identified in the 200 series. The third alternate wheel is shown at 210. The wheel 210, in this embodiment, includes a plurality of adjacent spokes 222, each having a substantially T-shaped cross-sectional configuration believe to provide even further enhancements to stiffness and structure of the wheel. The alternate spokes 222 also progressively increase in mass toward the axis a to move the moment of inertia close to the axis a as should be evident in FIGS. 9A and 9B. Each spoke 222 defines an opposing first leg 228 with an adjacent spoke 222 disposed in a similar plane and an opposing second leg 230 being disposed in planes that intersect at the axis a of the wheel 210. For brevity, same elements of the wheel 210 of the third embodiment as those embodiments set forth above will not be described again. However, it should be understood to those of ordinary skill in the art that the wheel 210 of the third embodiment include as-cast and substantially as-cast spokes 222 along with other inventive features set forth above.

Obviously, many modifications and variations of the present invention are possible in light of the above teachings foregoing invention has been described in accordance with the relevant legal standards; thus, the description is merely exemplary rather than limiting in nature. Variations and modifications to the disclosed embodiment may become apparent to those skilled in the art and do come within the scope of the invention. Accordingly, the scope of the legal protection afforded this invention can only be determined by studying the following claims.

What is claimed is:

1. A cast aluminum wheel, comprising:
   a rim element having an annular configuration defining an axis, said rim element including a wall extending circumferentially around said axis between a proximal bead and a distal bead;
   a central element extending radially outwardly between said axis and said rim element, said central element including a lug member and a plurality of spoke pairs extending radially outwardly between said proximal bead and said lug member with each spoke of said spoke pairs including a first leg and a second leg together defining an L-shaped section; and
   each of said first legs of said spoke pairs having a generally constant axial thickness in a direction toward said axis from said rim element while each of said second legs of said spoke pairs progressively increasing in volume in a direction toward said axis from said rim element thereby providing increased stiffness of said spoke pairs proximate said axis relative to said rim element.

2. The wheel set forth in claim 1, wherein each of said plurality of spokes defines a cross-section having an increasing cross-sectional area progressing radially inwardly toward said axis.

3. The wheel set forth in claim 1, further including a web portion extending between adjacent of said spokes.

4. The wheel set forth in claim 1, wherein said central element includes a centrally located lug member defining lug apertures located radially inwardly of each of said plurality of spokes.

5. The wheel set forth in claim 1, wherein each of said second legs of said spoke pairs include a progressively increasing thickness in a direction toward said axis.

6. The wheel set forth in claim 4, wherein said central element is substantially as-cast between said lug member and said rim element.

\* \* \* \* \*